United States Patent [19]

Brems

[11] 3,961,607
[45] June 8, 1976

[54] INTERNAL COMBUSTION ENGINE

[76] Inventor: John Henry Brems, 32867 White Oaks Trail, Birmingham, Mich. 48010

[22] Filed: May 12, 1972

[21] Appl. No.: 252,840

[52] U.S. Cl. .......................... 123/78 R; 123/51 R; 123/53 R; 123/78 D
[51] Int. Cl.² ................. F02B 75/04; F02B 25/12
[58] Field of Search ............. 123/78 R, 78 D, 78 A, 123/48 R, 48 A, 48 AA, 78 AA, 51 AA, 51 BA, 51 R, 53 AA, 53 BA, 53 R, 53 C

[56] References Cited
UNITED STATES PATENTS

| | | | |
|---|---|---|---|
| 1,498,757 | 6/1924 | Robertson | 123/53 A |
| 1,574,244 | 2/1926 | Goldsmith | 123/51 AA |
| 3,446,192 | 5/1969 | Woodward | 123/53 A |

FOREIGN PATENTS OR APPLICATIONS

| | | | |
|---|---|---|---|
| 610,503 | 6/1926 | France | 123/78 R |
| 416,968 | 12/1946 | Italy | 123/53 BA |
| 3,427 | 1888 | United Kingdom | 123/53 A |
| 396,794 | 8/1933 | United Kingdom | 123/78 D |

*Primary Examiner*—Wendell E. Burns
*Attorney, Agent, or Firm*—Barnes, Kisselle, Raisch & Choate

[57] ABSTRACT

An internal combustion engine construction to improve thermodynamic efficiency by providing, in addition to the standard cylinders and pistons, a supplemental cylinder connected to each combustion chamber of each cylinder and, a piston in each supplemental cylinder associated to move in conjunction with the standard pistons, the relationship of the association being such that the volume of the combustion chamber can be enlarged or ensmalled either by a manual control or an automatic control regulable in response to engine conditions and to modify the volume time relationship.

12 Claims, 24 Drawing Figures

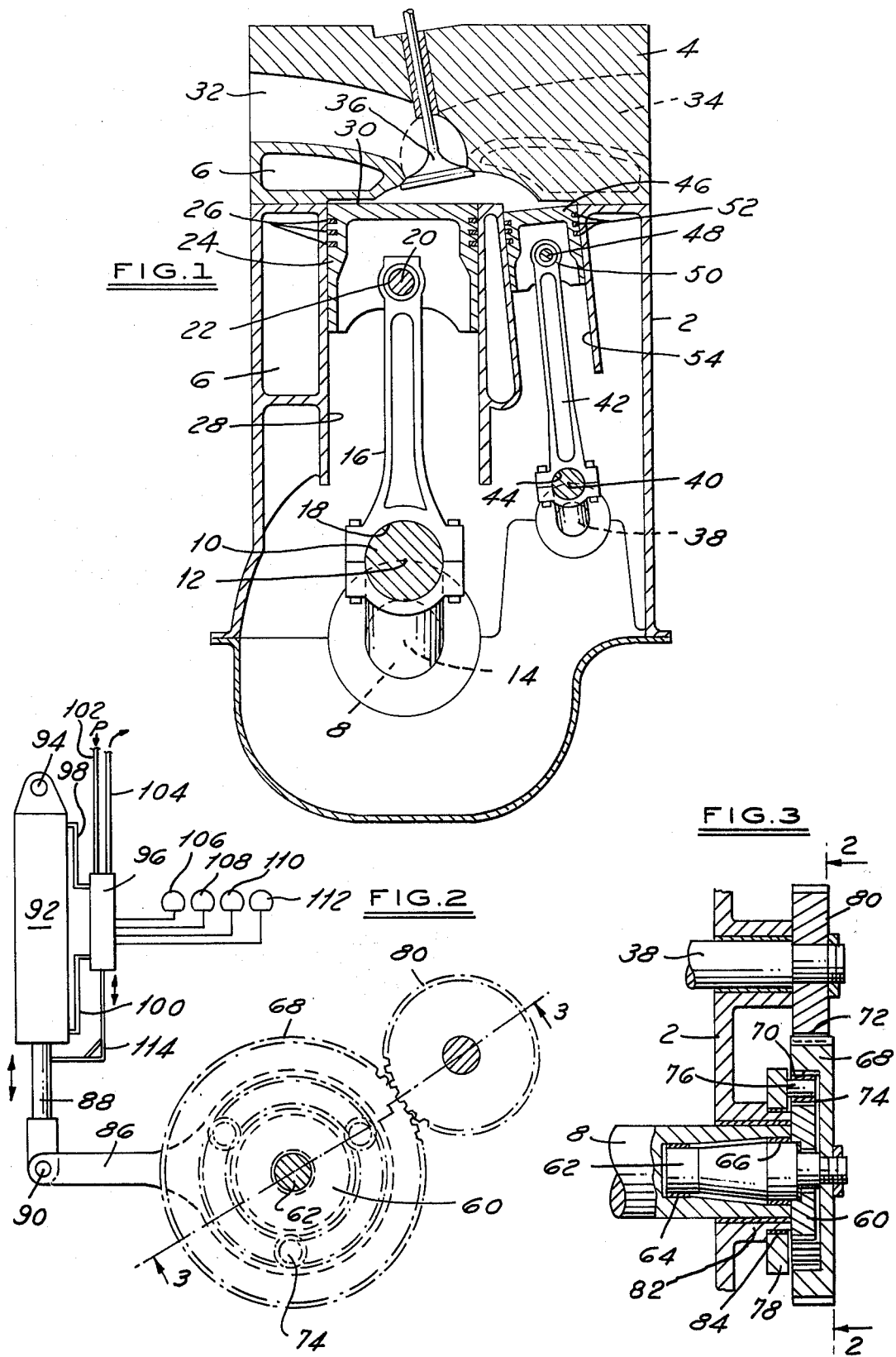

Figure 20:
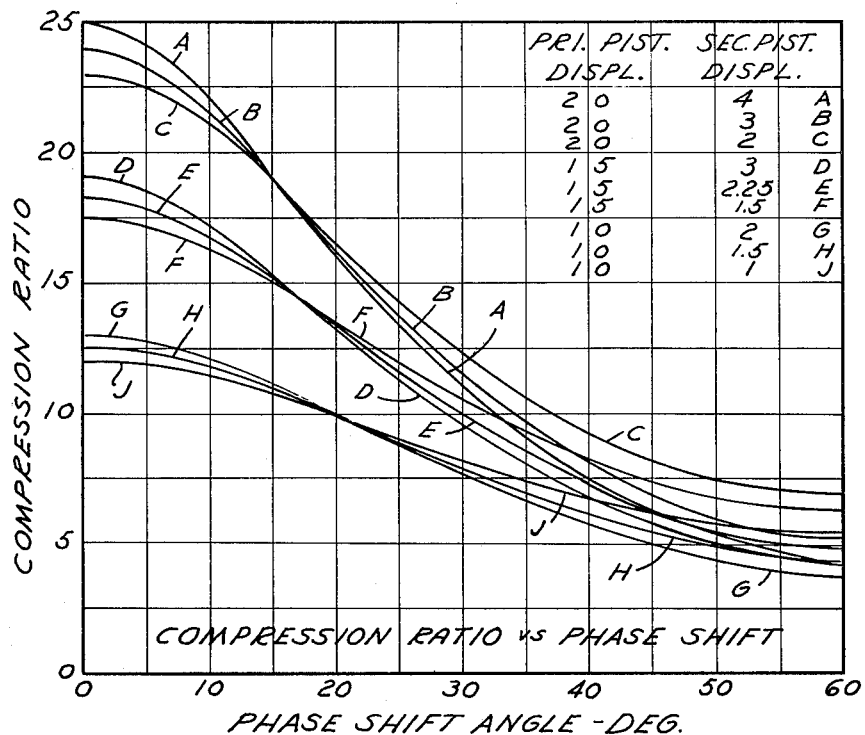

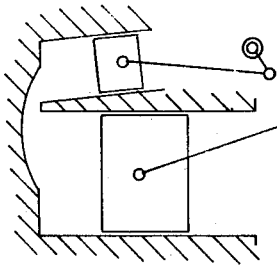
FIG.8  80° A.T.D.C.
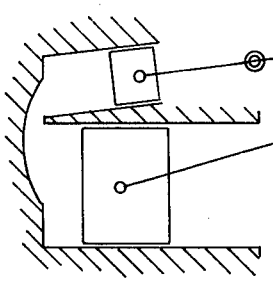
FIG.7  60° A.T.D.C.
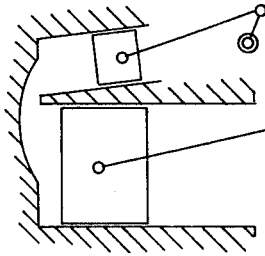
FIG.6  40° A.T.D.C.
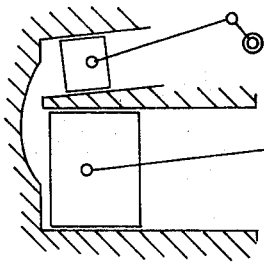
FIG.5  20° A.T.D.C.
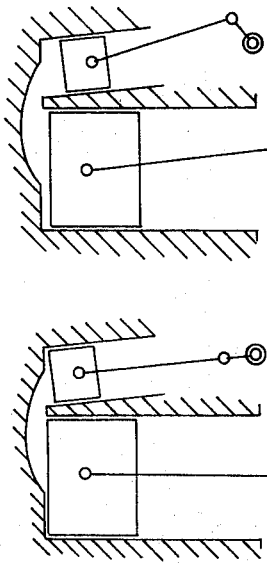
FIG.4  T.D.C.
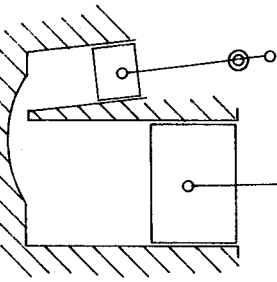
FIG.13  180° A.T.D.C.
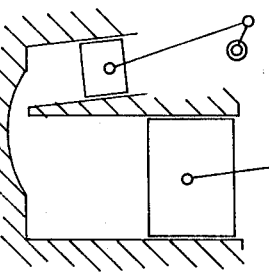
FIG.12  160° A.T.D.C.
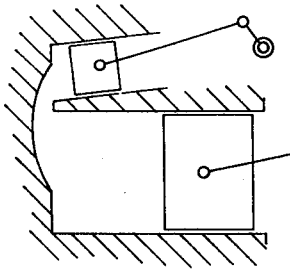
FIG.11  140° A.T.D.C.
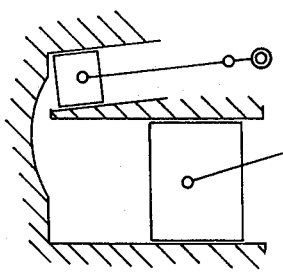
FIG.10  120° A.T.D.C.
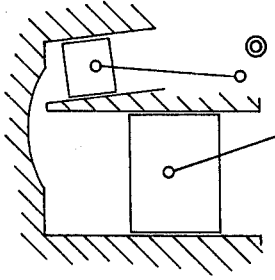
FIG.9  100° A.T.D.C.

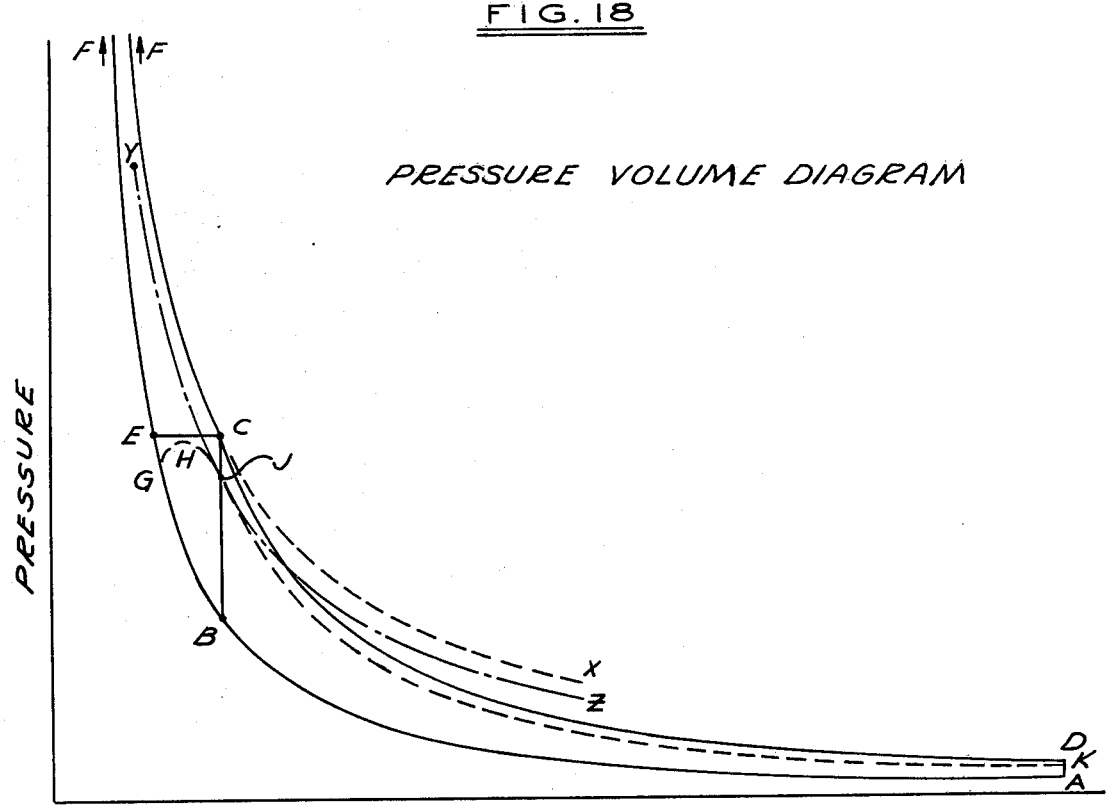
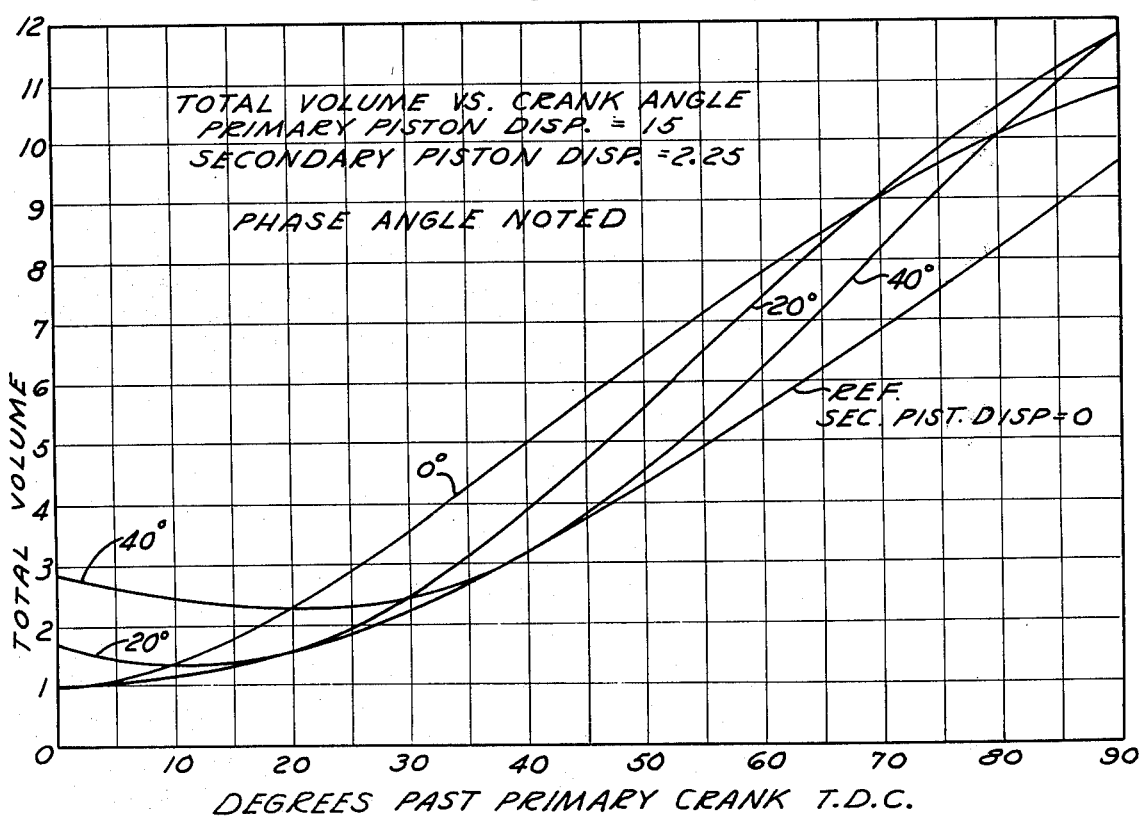

EXPANSION RATIO vs. CRANK ANGLE @ 10°, 20°, 30° & 40° PHASE SHIFT ANGLE. PRI. PIST. DISP. = 1.5; SEC. PIST. DISP. = 2.25

3,961,607

INTERNAL COMBUSTION ENGINE

This invention relates to an improvement in the mechanical design of internal combustion engines.

It is an object of this invention to improve the thermodynamic efficiency of an internal combustion engine through a closer approach to the Carnot Cycle.

It is a further object of this invention to improve the combustion characteristics of an internal combustion engine and thereby decrease the pollutants due to incomplete combustion.

It is a further object of this invention to reduce the peak temperatures reached under any given set of load conditions, thereby reducing the formation of the oxides of nitrogen, another pollutant.

It is a further object of this invention to provide a system whereby the compression ratio of the engine may be changed during operation in response to varying load conditions to approach identical combustion conditions despite changes in input manifold pressure.

It is a further object of this invention to provide a mechanical design in which the "smoothness" of a V-8 type design can be equalled with an engine having only four combustion chambers.

It is a further object of this invention to provide a mechanical design in which it is possible to use higher compression ratios without creating conditions conductive to the phenomenon of knocking.

It is a further object of this invention to provide a design whose lower pollution characteristics are not apt to deteriorate with engine use and lack of maintenance.

Other objects and features of the invention relating to details of construction and operation will be apparent in the following description and claims.

Drawings accompany this disclosure and the various views thereof may be briefly described as follows:

FIG. 1, a transverse cross-section through a typical combustion chamber illustrating the multiple piston arrangement.

FIG. 2, a transverse cross-section 2—2 (FIG. 3) through the gear system which interconnects the primary and secondary crankshaft.

FIG. 3, a longitudinal cross-section 3—3 (FIG. 2) through the gear system shown in FIG. 2.

FIGS. 4 to 13, a series of schematic sequence sketches which qualitatively illustrate the volume to crank angle relationships during a 180° movement of the primary crankshaft.

Figure 14:
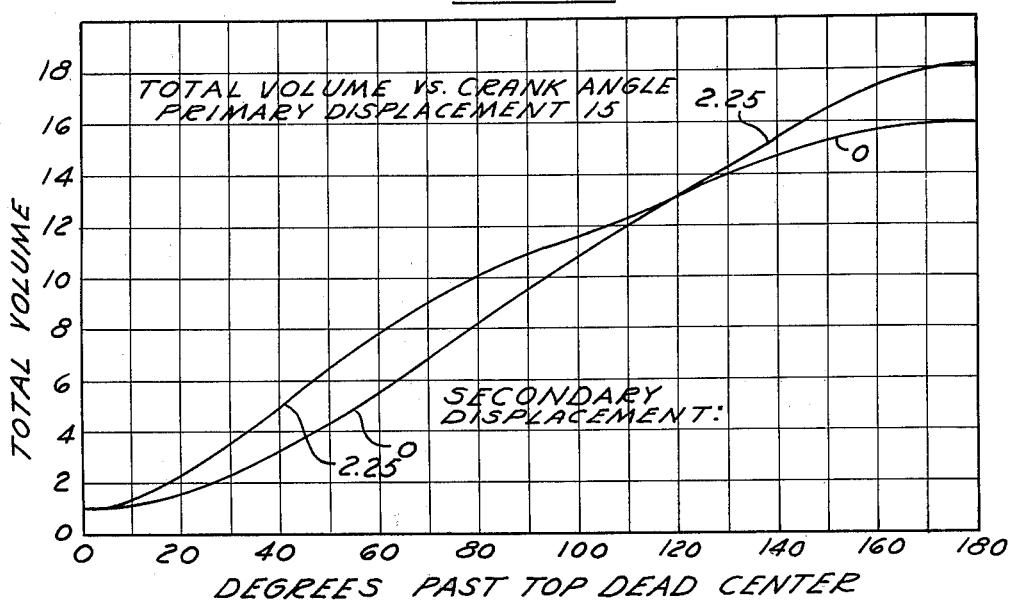

FIG. 14, two curves quantitatively relating combustion chamber volume to primary crankshaft angle for a single piston engine and for a multiple piston engine having a secondary piston displacement of 15 percent of the primary piston displacement, for 180° of primary crankshaft rotation.

Figure 15:
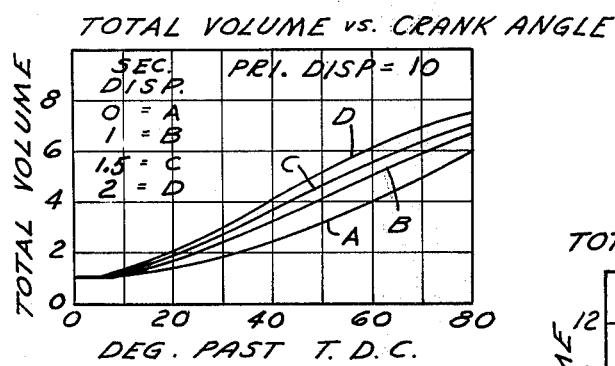
Figure 16:
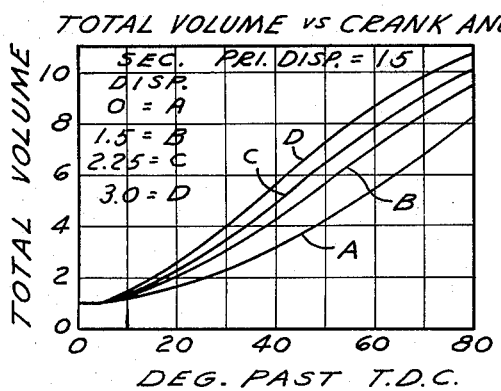
Figure 17:
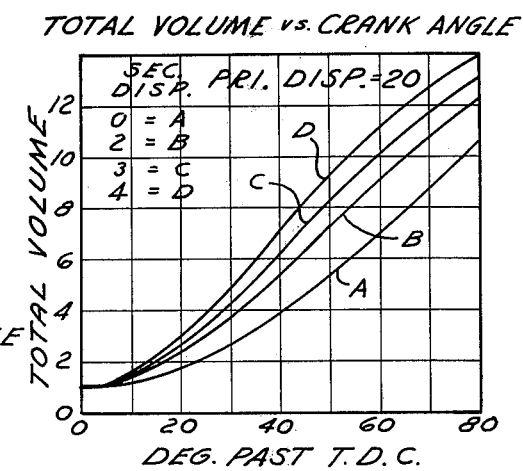

FIGS. 15, 16 and 17, three sets of curves relating total volume to primary crankshaft angle during the first 80° of rotation past the top dead center position for various combinations of primary and secondary piston displacement.

FIG. 18, a pressure volume diagram comparing Carnot, Otto and Diesel cycles illustrating the effect of the multi-piston engine.

FIG. 19, a family of curves relating the total volume with primary crankshaft angle for various phase angles of the secondary crankshaft and a secondary piston displacement of 15 percent of the primary piston displacement.

FIG. 20, a family of curves relating compression ratio to phase shift angle for various combinations of primary piston displacement and secondary piston displacement.

FIGS. 21, 22, 23 and 24, a series of curves relating the expansion ratio to the crank angle after the angle of minimum volume for various phase shifts and a constant primary and secondary piston displacement.

Referring to the drawing FIG. 1, an engine block 2 has bolted to it a cylinder head 4, each of which is provided with suitable water cooling passages 6.

A primary crankshaft 8 is journalled in suitable bearings of conventional design in the block 2. A rod journal 10 which is part of the primary crankshaft 8 has a centerline 12 which is eccentric to the centerline of rotation 14. A connecting rod 16 is journalled to the eccentric rod journal 10 through rod bearing 18.

The other end of the connecting rod 16 is pivotally connected to wrist pin 20 through the wrist pin bearing 22; the wrist pin 20 in turn is connected to the primary piston 24. Piston rings 26 are mounted in grooves in the piston 24 for oil scraping and compression. Therefore, as the primary crankshaft rotates about its centerline 14, the primary piston 24 moves up and down in the engine block bore 28 changing the volume in the combustion chamber 30.

The cylinder head 4 has provided in it suitable intake passages 32 and exhaust passages 34 which are connected to the combustion chamber 30 by poppet valves 36. These valves 36 are operated by a suitable valve train (not shown) from a suitable cam shaft in a conventional manner. In a spark ignition engine, one or more spark plugs (not shown) are provided in the combustion chamber 30 and are operated by a conventional ignition system.

The entire engine system as described up to this point is of conventional contemporary design and the single combustion chamber shown may be considered as one cylinder of any of the presently popular engine configurations, e.g., 4, 6, V-8, etc.

In addition to the conventional components described above, this new engine incorporates a secondary crankshaft 38 mounted in suitable bearings in the block 2. A rod eccentric 40, part of the secondary crankshaft 38, is rotatably connected to a secondary connecting rod 42 through rod bearing 44. The upper end of the connecting rod 42 is connected to a secondary piston 46 through a wrist pin 48 and wrist pin bearing 50. This secondary piston 46 is also fitted with suitable piston rings 52 and operates in a secondary bore 54 in the block 2. The displacement of the secondary piston 46 is less than the displacement of the primary piston 24, and in the scale of FIG. 1 is approximately 15 percent of the primary piston displacement.

It will be noted that the combustion chamber 30 forms an interconnecting passage between the displacement volumes swept by the primary and secondary pistons. Therefore, the motion of both pistons through their respective bores influence the total volume in the combustion chamber 30.

The primary crankshaft 8 and the secondary crankshaft 38 are interconnected through some suitable gear, chain, or cog belt system such that the secondary crankshaft 38 rotates at a higher speed (angular velocity) than the primary crankshaft 8, provided further that this higher speed is an integral number of half multiples of the primary crankshaft speed, i.e., 1½, 2, 2½, 3, 3½, etc. in the case of four cycle engines; or an integral multiple of primary crankshaft speed, i.e., 2, 3, 4 etc., in the case of two-cycle engines.

It is also desired that means be provided to permit shifting the phase over a slight range between the primary crankshaft and the secondary crankshaft without disturbing their long time multiple speed relationship.

A simple system to accomplish this is shown in FIGS. 2 and 3. The particular gear diameters shown in these drawings are scaled to cause the secondary crankshaft 38 to rotate at an angular velocity three times as great as that of the primary crankshaft 8.

Referring to FIG. 3, one end of the primary crankshaft 8 has bolted to it a sun gear 60, and additionally supports a countershaft 62 in bearings 64 and 66. This countershaft 62 is bolted to a gear 68 which contains both internal gear teeth 70 and external gear teeth 72. The internal teeth 70 cooperate with three planetary gears 74 mounted on three stub shafts 76 which in turn are mounted on a planetary carrier 78. These planetary gears 74 also are in mesh with the sun gear 60; therefore, when the planetary carrier 78 is stationary, the gear 68 rotates at a reduced angular velocity with respect to the primary crankshaft 8.

The external gear teeth 72 of the gear 68 mesh with a gear 80 bolted to the end of the secondary crankshaft 38. As long as the planetary carrier 78 is stationary, the secondary crankshaft 38 rotates at three times the angular velocity of the primary crankshaft 8.

However, the planetary carrier 78 is rotatably mounted to a boss 82 on the block 2 through a bearing 84. An actuator arm 86 integral with or attached to the planetary carrier 78 is used to shift the planetary carrier through a small angle, to vary the phase between the two crankshafts 38 and 8. The outboard end of this actuator arm 86 is connected to a servo-cylinder rod 88 by pin 90; the body of the servo-cylinder 92 in turn is connected to the block 2 by pin 94. The extension or retraction of the servo-cylinder rod 88, in response to suitable controls, causes the planetary carrier 78 to rotate on bearing 84 shifting the planetary gears 74, and adding or subtracting to the sun gear 60 output to the internal gear 68. It can be seen that this causes the phase of the secondary crankshaft 38 to shift with respect to the primary crankshaft 8 even though their long term speed ratio is unchanged. The relevance of this phase shift characteristic is explained subsequently.

The phase shift is controlled by a servo-valve 96 which supplies oil to the blind end of the cylinder 92 through oil line 98, or to the rod end of the cylinder 92 through oil line 100. Oil in turn is supplied to the servo-valve 96, through a pressure line 102 and subsequently returned to the sump through a return line 104.

The servo-valve is responsive to four major parameters of engine operation: The inlet manifold pressure as measured by pressure transducer 106; the engine speed as measured by a speed transducer (tachometer) 108; the engine temperature as measured by temperature transducer 110; and the inlet air temperature as measured by temperature transducer 112.

For each combination of these primary parameters there is an optimum position of the servo-cylinder rod 88. The position of this rod is detected by the feedback linkage 114.

The qualitative behavior of this system may be visualized with the assistance of the schematic sketches shown in FIGS. 4 to 13 which illustrate the volume time characteristics of the combustion chamber. The sketches are based on the condition that the system is operating at a 0 phase angle which means both pistons reach the tops of their strokes at the same time, and further that the secondary crankshaft 38 is rotating at an angular velocity three times as great as the angular velocity of the primary crankshaft 8.

Referring to FIG. 4, both pistons are at the top of their travel which coincides with or occurs slightly after the initiation of combustion, and both crankshafts are at their top dead center position. At this time the volume in the combustion chamber 30 is at its minimum point.

FIG. 5 shows the condition that is reached after the primary crankshaft 8 has rotated 20° beyond its top dead center position; at this time, the secondary crankshaft 38 has rotated 60° beyond its top dead center position. It will be noted that the total volume in the combustion chamber has been increased due to the slight downward movement of the primary piston 24, and the greater downward movement of the secondary piston 46. The total volume in the combustion chamber 30 and the rate of expansion are both significantly greater than those which would be achieved through the movement of the primary piston 24 alone.

In FIG. 6, the primary crankshaft has rotated 40° past its top dead center position; at this same time, the secondary crankshaft has rotated 120° past its top dead center position. It can be seen that the total volume in the combustion chamber 30 and the rate of expansion are both still significantly greater than those which would exist due to the movement of the primary piston 24 alone.

In FIG. 7, the primary crankshaft 8 has rotated 60° beyond its top dead center position, and the secondary crankshaft has rotated 180° beyond its top dead center position reaching its bottom dead center position. The total volume in the combustion chamber 30 is again still significantly greater than it would be due to the movement of the primary piston 24 alone, but with the secondary piston 46 now momentarily standing still at the bottom of its stroke, the expansion rate is now due entirely to the movement of the primary piston 24 alone.

In FIG. 8, the primary crankshaft 8 has rotated 80° past its top dead center position and the secondary crankshaft 38 has now rotated 240° past its top dead center position or 60° past its bottom dead center position. The secondary piston 46 is therefore on its way back up and the total volume in the combustion chamber 30, while still more than it would be due to the primary piston 24 alone, is proportionally less than before. Furthermore, the expansion rate is less than it would be with only the primary piston 24. However, the upward motion of the secondary piston 46 is transferring gases from its displacement volume into that of the primary piston 24 adding to the turbulence.

In FIG. 9, the primary crankshaft 8 has rotated 100° past its top dead center position, and the secondary crankshaft 38 has rotated 300° from its top dead center position and is now only 60° away from reaching its top dead center position again. The general conditions are the same as in FIG. 8, but to a greater degree.

In FIG. 10, the primary crankshaft 8 has rotated 120° past its top dead center position, while the secondary crankshaft 38 has again reached its top dead center position, thereby returning all the gases in the displacement volume of the secondary piston 46 back into the primary piston 24 displacement volume. At this point, both the total volume and the expansion rate are exactly the same as would be achieved with the primary piston 24 alone. The essential purpose of the secondary piston 46 has been accomplished, as will be further described.

In FIGS. 11 and 12, both pistons move downward again, until in FIG. 13, both pistons have reached their bottom dead center position completing the expansion stroke.

It should be noted that the compression stroke is exactly the inverse of the expansion stroke described above. Under compression conditions, the primary advantage to be gained by this multipiston engine system is the significantly better mixing, even before combustion, due to the partial transfer back and forth of the gases between the displacement volumes of the two pistons.

All thermodynamic theory concerns itself with the shape and area enclosed within the pressure-volume or temperature-entropy diagrams. Yet, from a purely theoretical point of view, the work performed per cycle is dependent only on the area enclosed within such a diagram and is independent of the time rate of movement around a given cycle. In a conventional engine having one piston per combustion chamber (or even those having two pistons operating at the same cyclic speed), the time rate of movement around a cycle is locked in by the mechanical geometry of the engine. Even when an engine is accelerating or decelerating, this relationship changes only slightly and temporarily. This is true independent of engine speed. For regardless of the total time for a given cycle, that fraction of the total time consumed for a given sector or portion of a cycle remains independent of speed and is controlled solely by the mechanical geometry of the engine, since the volume time relationship is mechanically determined.

This condition is clearly demonstrated by considering the volume-time relationship. In all diagrams, the total time required for compression and expansion will be taken as 360 units of time. Each such unit of time is then that time taken for the primary crankshaft 8 to rotate through an angle of one degree. A typical set of comparative quantitative curves is shown in FIGS. 14, 15, 16 and 17. In this and all other curves, unless otherwise noted, the piston displacement-crank angle relationship has been calculated using a connecting rod length equal to 1.75 times the stroke of the associated piston, which is a good approximation to practical engine design. This applies to the connecting rod length ratios for both the primary and secondary pistons. In FIGS. 14–17, the calculations are made on the assumption that the minimum volume is one unit, and that both pistons reach top dead center at the same time, i.e., the phase angle is 0. Finally, it is assumed that the secondary crankshaft is rotating three times as fast as the primary crankshaft. Zero time or zero degrees crank angle is defined as occurring when the primary piston and crankshaft are at top dead center. It is at this point that the minimum volume is reached. With 0 phase angle the secondary piston and crankshaft are also at their top dead center at this time.

FIG. 14 compares the volume-time (crank angle) relationship for two theoretical combustion chambers, each of which has a primary piston whose displacement is 15 times the minimum volume. One curve, marked 0, shows the total volume as the primary crankshaft rotates through 180° for a situation where the displacement of the secondary piston is 0, i.e., there is no effect from a secondary piston. The second curve, marked 2.25 is for a theoretical combustion chamber having the same primary piston displacement, but also includes the effect of a secondary piston whose displacement is 2.25 units, or 15 percent of the primary piston displacement. The much more rapid increase in total volume or expansion rate is clearly evident during the first 60° of primary crank angle.

FIG. 15 compares the expansion rates through the volume-crank angle relationships for four values of secondary piston displacement and a fixed primary piston displacement of 10 units (relative to a minimum volume of one unit). Curve A shows the volume time relationship for a situation in which the displacement of the secondary piston is 0; this is the base or reference situation and represents a conventional single piston engine. The curves are shown only from 0° to 80° of primary crankshaft rotation because this is the primary area of interest.

Curve B shows the expansion rate when the secondary piston displacement is 10 percent of the primary piston displacement, i.e., one unit volume. A very significant improvement in the time rate of volume increase is noted.

Similarly, curve C shows the expansion rate when the secondary piston displacement is 15 percent of the displacement of the primary piston, i.e., 1.5 unit volumes; a further increase in the rate of volume change is to be seen.

Curve D represents the data for the expansion rate when the secondary piston displacement is 20 percent of the displacement of the primary piston, i.e., 2 unit volumes; once again, a still further increase in the rate of volume change is apparent.

In FIG. 16, four comparable curves are presented, but in this case the constant primary piston displacement is 15 unit volumes. The four curves represent the conditions when the secondary piston displacements are 0, 10, 15, and 20% of the primary piston displacement or 0, 1.5, 2.25 and 3.0 unit volumes. As before, the rate of volume increase or expansion rate increases with secondary piston displacement; furthermore, it will be noted that it also increases with primary piston displacement.

Similarly, in FIG. 17, four additional comparable curves are presented, but in this case the constant primary piston displacement is 20 unit volumes. The four curves again represent the conditions when the secondary piston displacements are 0, 10, 15 and 20% of the primary piston displacement or 0, 2.0, 3.0 and 4.0 unit volumes. The increase in the expansion rate with the secondary piston displacement is to be noted, and, by comparison with the curves of FIGS. 15 and 16, the increase in the expansion rate with primary piston displacement.

The increase in expansion rate shown above would be of small interest if the heat release due to combustion in an Otto cycle engine were instantaneous (constant volume) as theoretically assumed. The heat release in an Otto cycle engine requires finite time and this is of great practical importance.

Since the combustion or heat release does require a finite time, it becomes possible to combine this effect with the faster expansion of the burning gases such that the heat release becomes more nearly constant pressure, as in a theoretical Diesel Cycle, or even more nearly constant temperature as in a Carnot Cycle.

The increase in expansion rate, when applied to a Diesel Cycle, also modifies the heat release portion of the cycle by moving it in the direction of more nearly isothermal expansion.

Thermodynamically, for a given peak temperature, the optimum efficiency is reached when the heat is released into the working gas at a constant temperature which is that peak temperature, i.e., the heat release into the gas exactly matches the heat input required by the gas for isothermal expansion. The theoretical Otto Cycle diverges widely from this optimum since all heat is theoretically released into the gas at a constant volume. The Diesel Cycle does better in that the heat is theoretically released into the fluid at a constant pressure although this is not achieved in practice.

A relatively higher expansion rate during combustion or heat release causes either cycle to more nearly approach the Carnot Cycle ideal of isothermal heat addition.

This situation is graphically illustrated in FIG. 18, a pressure-volume diagram with superimposed Otto, Diesel, and Carnot Cycles which reach the theoretically identical peak temperature. Line CD is the common expansion line after heat release or combustion; this is an adiabatic expansion line, which means that heat is neither added or lost during this expansion.

An Otto Cycle proceeds from point A to point B along line AB which is also an adiabatic line; a quantity of heat Q is added at this minimum volume point causing the pressure to be raised from B to C along the constant volume line BC. The indicated work produced by this cycle is area ABCDA. (The exhaust end of the cycle is squared off for simplification and since it is not relevant to the comparison.)

A diesel Cycle utilizing this same heat input Q is shown by diagram ABECD. Here the adiabatic compression proceeds beyond point B to point E. The same quantity of heat Q is added while the gas expands at constant pressure from E to C. The additional work performed by the Diesel Cycle as compared to the Otto Cycle for the same heat input Q, and the same peak temperature and pressure is the area enclosed by BECB.

A theoretical Carnot Cycle is shown by diagram ABEFCD; it will be noted that point F is not explicitly shown on the diagram but is some distance beyond its upper limit. The adiabatic compression proceeds beyond point E to point F. The same quantity of heat Q is added while the gas expands at constant temperature along line FC. The work output of the entire cycle is area ABEFCDA; for the same heat input Q, and with the same peak operating temperature, the additional work output relative to the Diesel Cycle is area FCEF; and the additional work output relative to the Otto Cycle is area BEFCB.

This analysis clearly shows the advantages of constant temperature heat input which has been recognized for many years. Indeed, even to approach the theoretical ideal is to move in the right direction. Its full attainment creates a practical problem in that the peak pressures become excessive. However, a compromise between the full Carnot Cycle and the Otto or Diesel Cycle is obviously desirable.

As noted earlier, nothing in the thermodynamic theory concerns itself with the rate at which the gas moves from point to point on these theoretical lines. But by introducing the practical knowledge that the combustion or heat release requires finite time, it is easily seen that a more rapid initial expansion during the combustion process cause that combustion or heat release to move in the direction of the Carnot concept of isothermal heat addition.

Looked at another way, a more rapid early expansion permits the use of higher compression ratios than conventionally possible since this more rapid early expansion reduces the temperature and pressure peaks which would be reached with the normal expansion rates of single piston engines.

The technique or more rapid early expansion will not necessarily result in the full achievement of isothermal heat addition (which is not fully desired because of excessive pressure) but it will more nearly approach it and in so doing will improve the thermodynamic efficiency of the engine. With this higher efficiency for a given peak temperature, it becomes possible to lower this peak temperature and achieve the same work output.

Such a diagram is shown by ABGHJKA, which has nominally the same area as ABCDA, the Otto Cycle, but reaches a lower peak temperature and lower peak pressure; it requires a smaller heat input, yet performs the same amount of work as the Otto Cycle.

This can be seen on the pressure volume diagram by noting that the line of heat addition for the Carnot Cycle, line FC, is a line of constant temperature (isothermal) which passes through point C, the point of common maximum temperature and pressure for the theoretically equivalent Otto and Diesel Cycles. For purposes of reference, this isothermal has been extended to point X; therefore, the line FCX is an isothermal representing the peak temperature of the Carnot, Otto, and Diesel Cycles.

The isothermal line representing the peak temperature reached in the cycle ABGHJKA is constructed through the peak temperature point J and is shown by the line YZ. The peak temperature reached at point J is approximately 11% less than the peak temperature reached at point C, even though the work output of ABGHJKA is nominally the same as the work output of ABCDA.

In other words, the improved thermodynamic cycle, attainable with the multispeed multipiston engine can be utilized with a combination of higher compression ratio, and smaller heat input, and reach a lower peak temperature, and also achieve higher efficiency.

A smaller heat input in turn permits the use of leaner air fuel ratios, assuring more complete combustion (up to a point, since extremely lean mixtures create other problems) improving the pollution characteristics of the engine insofar as the emission of unburned or incompletely burned hydrocarbons are concerned. Lower peak temperatures, in turn, tend to decrease the formation of the oxides of nitrogen.

Knocking is a phenomenon whose basic mechanism has been understood for over 40 years; it is the instantaneous and spontaneous explosion of the last part of the air-fuel mixture before the orderly progression of the flame front has reached it. This results in an extremely sharp rise in pressure and the production of shock waves which is thermodynamically inefficient and mechanically objectionable.

Knock is influenced by the stability of the fuel and the temperature and pressure of the unburned remaining gases near the end of combustion. Here again, the multipiston engine will exert a very beneficial effect. The more rapid expansion during combustion will reduce the tendency to knock by reducing the rapid pressure and temperature rise which are inherent in a single piston type engine.

The foregoing discussion concerned itself with a brief summary of the advantages to be gained due to the more rapid initial expansion which may be achieved in a multipiston engine in which the secondary piston operates at a higher frequency than the primary piston, but with both pistons reaching their top dead center position simultaneously.

An equally important characteristic of this multipiston engine system is that it becomes possible to vary the compression ratio of the engine by altering the phase relationship of the secondary crankshaft with respect to the primary crankshaft. This is accomplished by shifting the planetary carrier with a hydraulic cylinder or other suitable actuator in response to the appropriate control information.

When both pistons reach their top dead center positions at the same instant, the volume in the combustion chamber at that instant is at its absolute minimum; but if the secondary piston reaches its top dead center position at some point before or after the primary piston has reached its top dead center position, the point of minimum volume will have been reached at some intermediate point; and this minimum volume will be greater than the minimum volume achieved when both pistons reach top dead center simultaneously.

Therefore, minimum volume is a function of phase relationship between the two crankshafts. This is illustrated by the four curves presented in FIG. 19. The parameters for these curves are as follows: the minimum volume with both pistons at T.D.C. (top dead center) is taken as 1 unit volume; the displacement of the primary piston is 15 unit volumes; and the displacement of the secondary piston is 2.25 unit volumes or 15% of the primary piston displacement; the secondary crankshaft rotates at an angular velocity three times that of the primary crankshaft; and the phase angle between them is variable. The total volume in the combustion chamber is plotted against primary crank angle for T.D.C. to 90° past T.D.C., which is the area of primary interest. The Curve marked 0 shows the volume-primary crank angle relationship when both the primary and secondary crankshafts are in phase, i.e., both crankshafts reach their top dead center positions simultaneously; this is the same curve as shown by Curve C in FIG. 16. The Curve marked 20 presents the volume-primary crank angle relationship when the secondary crankshaft is lagging by 20°., i.e., the secondary crankshaft reaches its top dead center position when the primary crankshaft is already past its top dead center position by 20 degrees. It will be noted that the minimum volume reached through the interaction of the two pistons is now approximately 1.3 unit volumes; and that this minimum volume is reached when the primary crankshaft is approximately 13° past top dead center.

Similarly, the curve marked 40 presents the volume-primary crank angle relationship when the secondary crankshaft is lagging the primary crankshaft by 40°, i.e., the secondary crankshaft reaches its top dead center position when the primary crankshaft is already 40° past its top dead center position. It will be noted that under these conditions, the minimum volume reached is approximately 2.3 unit volumes, and that this minimum volume is reached approximately 23° after top dead center of the primary crankshaft.

The curved marked "Ref." shows the volume-primary crank angle relationship for a secondary piston displacement of 0, i.e., the volume is determined by the primary piston displacement alone. Each of the other curves must be tangential to this reference curve at that angle by which the secondary crankshaft is lagging.

It can be seen that the minimum volume reached due to the combined action of both pistons increases significantly with increase in the phase angle as defined; all other parameters remain constant.

Compression Ratio is conventionally defined as the initial volume divided by the minimum volume. By defining initial volume as the volume in the combustion chamber when the primary crankshaft is at its bottom dead center position (which is not necessarily the maximum volume) the curves of FIG. 20 have been calculated. The Phase Shift Angle is that angle which the primary crankshaft has reached after its top dead center position when the secondary crankshaft reaches its top dead center position.

Referring to FIG. 20, Curves A, B and C were prepared using a primary piston displacement of 20 unit volumes and secondary piston displacements of 4, 3 and 2 unit volumes respectively, which represent secondary piston displacements of 20, 15 and 10% of the primary piston displacement.

Curves D, E and F show the compression ratios achieved with a primary piston displacement of 15 unit volumes and secondary piston displacements of 3, 2.25 and 1.5 unit volumes respectively; these again represent secondary piston displacements of 20, 15 and 10% of the primary piston displacement.

Similarly, Curves G, H and J show the compression ratios achieved with a primary piston displacement of 10 unit volumes and secondary piston displacements of 2, 1.5 and 1 unit volumes respectively; which again represent secondary piston displacements of 20, 15 and 10% of the primary piston displacement.

These curves clearly demonstrate the high degree of control which may be exercised over the compression ratio by merely changing the phase angle of the secondary crankshaft relative to the primary crankshaft. The effect is particularly significant within the range of 10° to 50° of phase shift.

Other relevant curves pertaining to phase shift are shown in FIGS. 21-24. The purpose of these curves is to show that the more rapid early expansion demonstrated for the "in phase" conditions of FIGS. 15, 16 and 17 apply equally well to the situations where the phase angle of the secondary crankshaft has been shifted to reduce the compression ratio. To illustrate this effect, it is meaningful to show a comparison between the actual expansion rate created by the out-of-phase multipiston engine and an equivalent single piston engine operating at the same compression ratio as the compression ratio of the multipiston engine at that specific phase angle. Since the actual compression ratio of the multipiston engine varies with phase angle, the comparison for each phase angle is made to a different equivalent single piston engine.

The expansion curves in FIGS. 21 to 24 for multipiston engines are all based on a three-to-one speed ratio between the secondary and primary crankshafts, a primary piston displacement of 15 unit volumes, a secondary piston displacement of 2.25 unit volumes, and a minimum volume of one unit volume in the combustion chamber when both pistons are simultaneously at their top dead center positions. However, for the individual graphs, the volumes have been rescaled to a new unit volume for each figure, such that the unit volume is equal to the minimum volume reached in the combustion chamber for each specific out-of-phase condition. This makes the set of curves more directly comparable. Furthermore, the time or crank angle axis has also been rescaled to read in time units or degress past the angle of the primary crankshaft at which the minimum volume is reached. This is again done to make all curves directly comparable.

Figure 21:
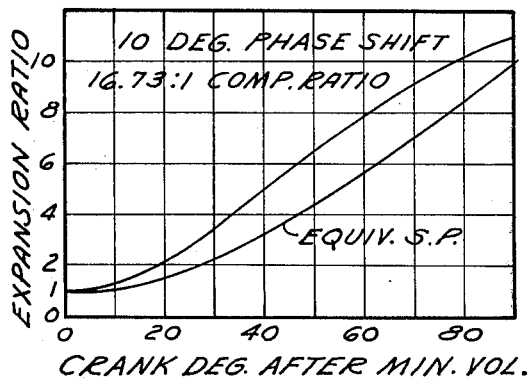

FIG. 21 presents the data for 10° out-of-phase condition with the unmarked curve. The effective compression ratio is 16.73 to one; if the crankshafts were in-phase and with the same mechanical parameters, the compression ratio would be 18.25 to 1. A second curve, marked "Equiv. S.P." presents the data for an equivalent single piston engine having a 16.73 to 1 compression ratio. By comparing the two curves, it will be noted that the multipiston engine again achieves a significantly better expansion rate than the equivalent single piston engine.

Figure 22:
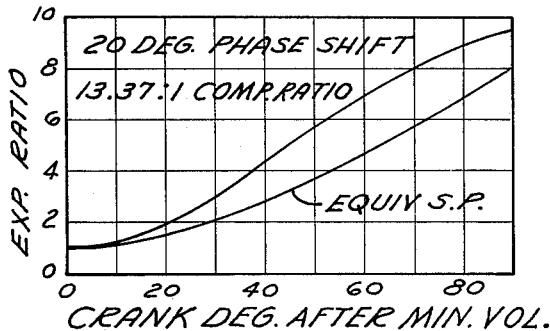

In FIG. 22, the expansion rate of the same multipiston engine, now operating with a 20° phase shift angle is presented by the unmarked curve. Under these conditions, a compression ratio of 13.37 to 1 is reached. A second curve, again marked "Equiv. S.P." presents the comparative data for an equivalent single piston engine having a 13.37 to 1 compression ratio; the improved expansion rate of the multipiston engine is again very clear.

Figure 23:
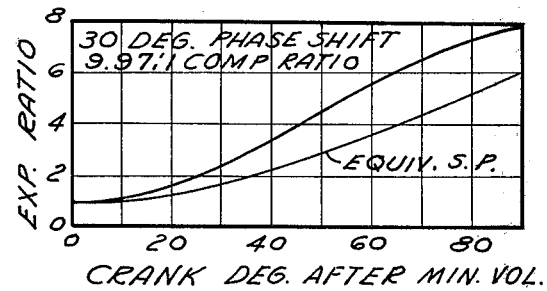

In FIG. 23, the unmarked curve presents the expansion rate data for the same multipiston engine now operating with a 30° phase shift; the compression ratio has now been reduced to 9.97 to 1. The comparative curve for a single piston equivalent engine, also operating with a 9.97 to 1 compression ratio, is marked "Eqiv. S.P." as before. Once again, the improved expansion rate of the multipiston engine is to be noted.

Figure 24:
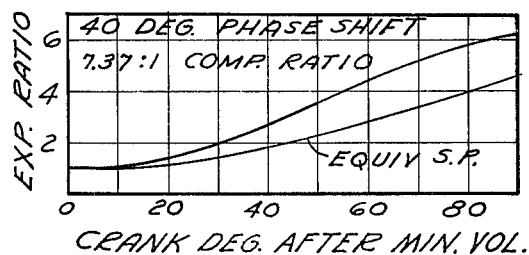

In FIG. 24, the unmarked curve presents the expansion rate data for the same multipiston engine, now operating with a 40° phase shift; the compression ratio has now been reduced to 7.37 to 1. The curve marked "Equiv. S.P." again presents the comparative data for an equivalent single piston engine, also operating with a compression ratio of 7.37 to 1. As before, the improved expansion rate of the multipiston engine is evident.

The curves presented in FIGS. 21 to 24 are illustrative only. The same general behavior may be proven for other values of primary and secondary piston displacements. In effect, it is intended to show that the improved expansion rates characteristic of the multipiston engine concept remain valid over some useful range, even when the phase is shifted to reduce the compression ratio.

The value of this ability to conveniently change the compression ratio while the engine is in operation is easily appreciated by considering the service criteria of most internal combustion engine applications, those which are used in automobiles. For a fixed compression ratio engine, a given compression ratio is selected so as to eliminate or minimize knocking, based on the fuels available and the minimum full throttle R.P.M. expected by virtue of the power train characteristics. A fixed compression ratio of approximately 8 or 10 to 1 is a reasonable representation for contemporary engines.

On the other hand, the percentage of time during which a given engine operates at or near full throttle is very small in normal use. It is quite likely that a major portion of the time, a typical engine is operating at half throttle or less. Knocking and other characteristics of combustion are, however, dependent upon the absolute temperatures and pressures reached in the combustion chamber and not upon the compression ratio alone. The absolute temperatures and pressures reached in the combustion chamber are partially dependent on the compression ratio of the engine, but are also dependent on the inlet air pressure (inlet manifold pressure), inlet air temperature, and to a lesser extent, engine temperature and speed. To illustrate, the temperature and pressure in the combustion chamber, just prior to combustion, in an engine operating at full throttle with a compression ratio of 8 to 1 would be nominally identical with the temperature and pressure in the combustion chamber, just prior to combustion, in an engine operating at half throttle with a compression ratio of 13.1 to 1, assuming identical inlet temperatures.

Since the characteristics of combustion and knocking are dependent on the absolute temperatures and pressures in the combustion chamber, it becomes desirable to vary the compression ratio so as to achieve near constancy of these variables even though the inlet temperatures and pressures vary over a considerable range. In essence, the optimum absolute maximum temperature and pressure may be determined for a given combustion chamber design and fuel available, such as to minimize knocking and keep the formation of the oxides of nitrogen to an acceptable level. At full throttle the corresponding compression ratio may be determined; this will be the minimum compression ratio. At the other end of the range, the maximum compression ratio will be determined by the lowest practical inlet manifold pressure. Within this range, the compression ratio will be varied, primarily in response to inlet manifold pressure to maintain nominal constancy of the maximum temperature and pressure in the combustion chamber.

With this engine system, it is anticipated that usable compression ratios of 15 to 1 or more will be practical for low load moderate speed conditions. This significantly increases thermodynamic efficiencies and is a gain over and above the improvements due to the more rapid relative expansion.

The attainment or approximation of constant combustion chamber temperatures and pressures, independent of load, will also increase the feasibility of other desirable techniques. Specifically, direct fuel injection into the combustion chamber as in the "space charge" engine will be more practical if the temperature and pressure of the air in the combustion chamber do not vary over nearly as wide a range as is the case in a conventional single piston fixed compression ratio engine.

Aside from the theoretical thermodynamic advantages which accrue from the more rapid relative expansion and variable compression ratio characteristics of the multiple piston system described above, several significant practical advantages also arise.

The first of these is the increased turbulence. It has been known for decades that turbulence in the combustion chamber is of value in increasing combustion efficiency, i.e., the complete combustion of all the fuel. This is a direct outgrowth of the more complete mixing of the fuel and air which is mechanically created by the turbulence. This in turn creates a more homogeneous mixture without local rich and lean areas. The more nearly perfect distribution of fuel in the air permits a leaner average mixture and this further assures more complete combustion. This will markedly reduce the unburned or partially burned fuel in the gas at the end of combustion. Increased turbulence also gives a rise to a faster orderly flame front propagation for a given air fuel ratio as opposed to the spontaneous final combustion of knocking.

The increased turbulence of the multipiston engine is an outgrowth of the mechanics of the situation. Consider the status of the combustion chamber when both pistons are at bottom dead center at the beginning of the compression stroke for a typical engine having a 3 to 1 speed ratio between the secondary and primary crankshafts operating with no phase shift. As the primary piston moves up, the secondary piston moves through its stroke such that it reaches its top dead center position when the primary piston has only reached a position of 60° past bottom dead center. During this interval, all of the gases in the secondary piston displacement area have been transferred into the primary piston chamber increasing the turbulence therein.

During the next 60° of primary crankshaft rotation, the secondary piston again reaches its bottom dead center position; a sizeable fraction of the gases in the primary piston displacement volume rush into the secondary chamber, adding to the turbulence of both chambers. Lastly, during the final 60° of primary crankshaft rotation during the compression stroke, the secondary piston transfers all the gases in its displacement volume back into the final volume reached when both pistons reach their top dead center positions. This mechanical transfer of the gases back and forth obviously increases the turbulence and mixing, improving the homogeneity of the mixture. The same effect occurs at various phase angles of the secondary crankshaft relative to the primary crankshaft though the angles of back and forth transfer may vary.

The inverse back and forth transfer of the gases occurs during the combustion and expansion stroke further improving orderly complete combustion. This more complete burning at a higher rate of flame front propagation will also permit leaner mixtures since one of the present deterrents to lean mixtures is the relative slowness of flame front propagation.

Another practical advantage of this rapid back and forth transfer of the gases is the reduction in the boundary layers of unburned or partially burned fuel which occurs at the relatively cold combustion chamber walls. The scrubbing action of the very turbulent gases reduces this layer and further assists in the complete oxidation of the fuel to water vapor and carbon dioxide.

Notwithstanding the greater complexity per combustion chamber, the multipiston engine can result in an overall simplification through a reduction in the number of combustion chambers per engine. The majority of engines manufactured today are of the V-8 type because of their smoothness which is a result of the number of power impulses per revolution. The volume of most single combustion chambers is in the range of 40 to 55 cubic inches.

A four combustion chamber engine of the multipiston type should compare in smoothness with a typical V-8 of today. It can be shown that the torque output of a multipiston engine would be much more uniform than that of a conventional four cylinder engine due to the torque contribution of the secondary crankshaft. Additionally, the inertia of the secondary crankshaft system would appreciably increase the flywheel characteristics of the total engine giving a smoother effect than a standard four cylinder engine.

The increase in combustion chamber size relative to a V-8 of the same total displacement would be advantageous by increasing the volume-surface ratio, thereby again decreasing the unburned or partially burned fuel due to boundary cooling.

Mechanically comparing a V-8 type conventional engine with a four combustion chamber multipiston engine, it is found that a V-8 is at a disadvantage with regard to the total number of components. Indeed, most of the advantages of a conventional four cylinder engine would apply to the four combustion chamber multipiston engine. Among these are: a narrow engine profile, simple intake and exhaust manifolds, a smaller number of ignition components, ease of incorporation of an overhead camshaft, larger connecting rod to crankshaft bearings (two rods need not share a single throw), and a reduction in the number of valve train components.

Each of the primary characteristics of the multipiston engine tends in the direction of improving the anti-pollution characteristics of internal combustion engines. The improved efficiency translates into less fuel per unit of power output which generates a reduction in pollutants even if the ratio of pollutants per unit of fuel were not changed.

The leaner mixtures which may be employed strongly tend towards significantly less unburned or partially burned hydrocarbons per unit of fuel consumed.

The violent turbulence tends towards reduucing unburned or partially burned hydrocarbons due to the greater mixture homogeneity and scrubbing of the wall boundary layer. Similarly, the potentially improved volume to surface ratio reinforces this improvement.

The potential lowering of the peak temperature through the more rapid early expansion and the improved thermodynamic cycle will decrease the formation of the oxides of nitrogen.

The ability to establish nominally uniform combustion conditions independent of the load and inlet manifold pressure means that the optimization of conditions for the minimum production of pollutants may be achieved over the entire normal working range of the engine from cold idle to hot full load. Furthermore, the establishment of these nominally constant conditions permit the utilization of other already known improvements such as the space charge technique.

The design shown in the present embodiment shows the axis of the primary and secondary cylinder bores at an angle to one another. In some designs, these may be made parallel; indeed the secondary piston may be incorporated into the cylinder head (rather than in the cylinder block) such that the pistons oppose one another on parallel or angled axes.

While all the data and discussions presented herein are predicated on the use of a three to one speed ratio between the secondary and primary crankshafts, the technique applies to all integral multiples of secondary crankshaft speed relative to primary crankshaft speed for two cycle engines, and to all integral half multiples (1½, 2, 2½, 3, 3½, etc.) of secondary crankshaft speed relative to primary crankshaft speed for four cycle engines. The only criterian is that the secondary piston cycle at a higher rate than the primary piston and that the secondary piston be in the same relative position to the primary piston at each firing point, exclusive of the controlled phase changes which produce the variation in the compression ratio.

It will be understood that the means of changing the phase angle of the secondary crankshaft relative to the primary crankshaft (while still maintaining their long term speed ratio) may be accomplished by a variety of common mechanical systems other than the planetary gears shown, e.g., two gears in mesh and acting as idlers between the main crankshaft gears, with a variable centerline position of the two idler gears; or two sprockets attached to the respective crankshafts, with means to vary the chain loop from one side of the sprockets to the other.

The servocylinder shown for varying the phase angle between the two crankshafts is convenient to use because engine oil pressure may be utilized as the motive force; however, it is also possible to use an electric motor and lead screw to actuate the phase shift system. It is also possible to use a large cylinder or bellows system directly actuated by the inlet manifold pressure to actuate the phase shift lever.

It will be understood that the control system will be responsive to one or more of the primary engine operating variables which are listed in order of significance:
1. Inlet Manifold Pressure
2. Engine Speed
3. Inlet Air Temperature
4. Engine Temperature For all other factors constant, an increase in inlet manifold pressure will cause the control system to decrease the compression ratio.

For all other factors constant, an increase in engine speed will cause the control system to increase the compression ratio.

For all other factors constant, an increase in inlet air temperature will cause the control system to slightly decrease the compression ratio.

For all other factors constant, an increase in engine temperature will cause the control system to slightly decrease the compression ratio.

The foregoing relationships are qualitative indications for the function of the control system. The exact optimum quantitative relationships will, of course, vary from engine design to engine design and will also depend on the exact engine design objectives sought, e.g., minimum pollution, minimum pollution/power ratio, maximum power/weight ratio, or others.

I claim:
1. An improvement in an internal combustion engine of the reciprocating piston type which comprises:
   a. means forming a primary cylinder cavity,
   b. means forming a secondary cylindrical cavity,
   c. primary and secondary pistons movable in each said respective cavities,
   d. means forming a passage between said primary and secondary cylindrical cavities to permit movement of gases independently of the position of said pistons,
   e. a primary crankshaft associated with said piston in said primary cavity,
   f. a secondary crankshaft associated with said piston in said secondary cavity,
   g. means interconnecting said crankshafts to cause said secondary crankshaft to rotate in a variable defined relationship to the rotation of said primary crankshaft, said interconnecting means including means to drive said secondary crankshaft at a higher angular velocity than said primary crankshaft and to rotate an average integral number of half revolutions for each revolution of said primary crankshaft.

2. An improvement in an internal combustion engine of the reciprocating piston type which comprises:
   a. means forming a primary cylinder cavity,
   b. means forming a secondary cylindrical cavity,
   c. primary and secondary pistons movable in each said respective cavities,
   d. means forming a passage between said primary and secondary cylindrical cavities to permit movement of gases independently of the position of said pistons, and
   e. means mechanically associating said first piston with said second piston to cause said second piston to move in said secondary cylinder in a variable predetermined timed relationship to the movement of said first piston, said means associating said pistons including means to drive said secondary piston at an average higher cycling rate than said primary piston wherein said secondary piston completes a plurality of strokes during a single stroke of said primary piston.

3. An internal combustion engine of the reciprocating piston type as defined in claim 1 in which means is provided to vary the connecting relationship of said crankshafts to effect a change in phase relationship between said crankshafts and effect a resulting variation in the effective compression ratio of the engine.

4. An internal combustion engine of the reciprocating piston type as defined in claim 2 in which means is provided to alter the association of said pistons to change the timed relationship and effect a variation in the effective compression ratio of the engine.

5. An internal combustion engine of the reciprocating piston type as defined in claim 3 in which the means to vary the connecting relationship of said crankshafts comprises a planetary gear set, one element of which is mounted for angular shifting to accomplish said phase shift.

6. In an internal combustion engine of otherwise conventional design to provide a variable volume combustion chamber comprising:
   a. an engine housing,
   a primary piston operating in a primary bore in said combustion chamber housing,
   c. a secondary piston operating in a secondary bore in said combustion chamber housing, said bores being connected to a common combustion chamber independent of piston position,
   d. a primary crankshaft connected to said primary piston through a connecting rod, such that said primary piston moves in and out of said primary bore as said primary crankshaft rotates, thereby creating a primary periodic change in said combustion chamber volume,
   e. a secondary crankshaft connected to said secondary piston through a connecting rod, such that said secondary piston moves in and out of said secondary bore as said secondary crankshaft rotates, thereby creating a secondary periodic change in said combustion chamber volume, and
   f. interconnecting means variable as to phase between said primary crankshaft and said secondary crankshaft to cause said secondary crankshaft to rotate at an average angular velocity which is substantially an integral multiple of one-half the angular velocity of said primary crankshaft, thereby interrelating said primary periodic change in combustion chamber volume and said secondary periodic change in combustion chamber volume.

7. An internal combustion engine of the reciprocating piston type as defined in claim 6 in which said interconnecting means includes a gear train, one element of which is a planetary gear set, and means to move at least one element of said gear set angularly to vary the phase relationship of said crankshafts.

8. An internal combustion engine of the reciprocating piston type as defined in claim 6 in which said interconnecting means includes means to vary the angular position of the crankshaft relative to the other while the engine is operating, the angular position adjustment ranging from a position in which both pistons reach top dead-center simultaneously to a position in which said secondary piston reaches bottom dead-center simultaneously with the top dead-center position of said primary position.

9. An internal combustion engine of the reciprocating piston type as defined in claim 7 in which said one element of said gear set is movable to vary the angular position of one crankshaft relative to the other while the engine is operating, the angular position of the shafts ranging from a position in which both pistons reach top dead-center simultaneously to a position in which said secondary piston reaches bottom dead-center simultaneously with the top dead-center position of said primary piston.

10. An internal combustion engine as defined in claim 1 in which means is provided to vary the connecting relationship of said crankshafts to effect a change in phase relationship between said crankshafts and a corresponding variation in the effective compression ratio of the engine in response to variations in at least one of the following engine conditions: inlet manifold pressure, engine speed, inlet air temperature and engine temperature.

11. An internal combustion engine as defined in claim 10 in which the means to vary the connecting relationship of said crankshafts includes a plurality of transducers, the outputs of which combine according to their weighted significance into a single reference signal delivered to a servo control system driving said means to vary said connecting relationship, said servo control system also generating a position feedback signal for comparison with said single reference signal.

12. An internal combustion engine as defined in claim 10 in which the means to vary the connecting relationship of said crankshafts comprises a planetary gear set, one element of which is mounted for angular shifting to accomplish said phase shift, a servo-control system, and a plurality of transducers, each responsive to an engine condition whose outputs are combined according to their weighted significance to provide a single input reference signal to said servo-control system.

* * * * *